Figures 1, 2, 3:
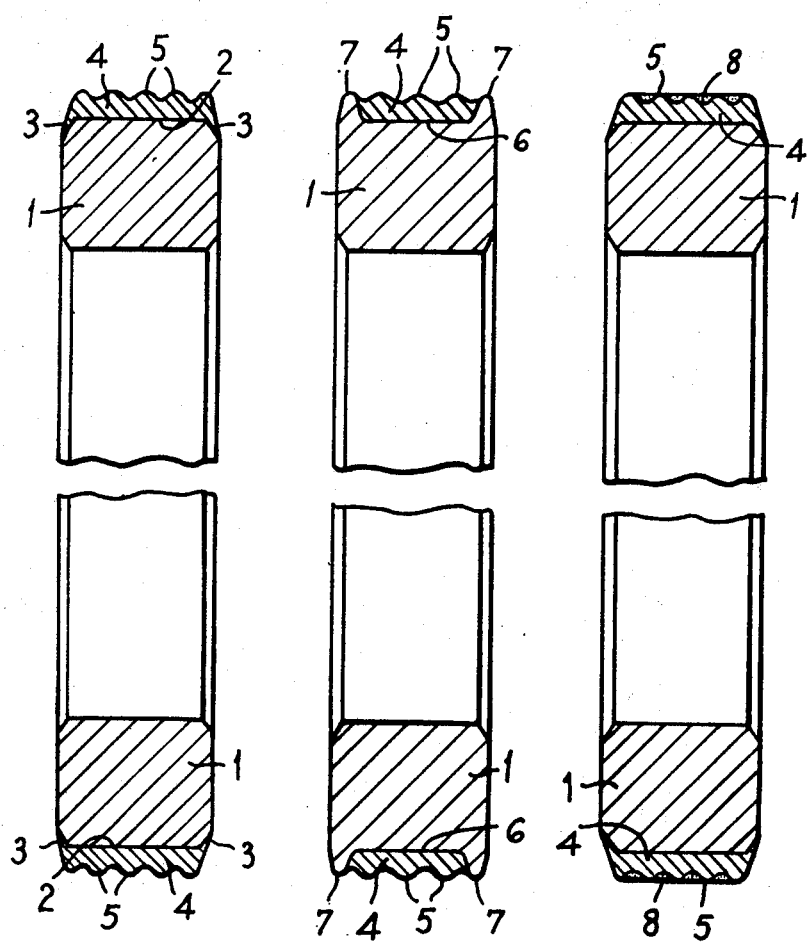

United States Patent

[11] 3,573,874

[72] Inventors Harold T. Hill;
 Ronald Morris Caton, Sway, England
[21] Appl. No. 719,447
[22] Filed Apr. 8, 1968
[45] Patented Apr. 6, 1971
[73] Assignee Wellworthy Limited
 Lymington, England
[32] Priority Apr. 12, 1967
[33] Great Britain
[31] 16880/67

[54] SEALING RINGS
 5 Claims, 3 Drawing Figs.
[52] U.S. Cl. .................................................. 277/208,
 277/235, 277/231
[51] Int. Cl. ....................................................... F16j 15/00,
 F02f 11/00
[50] Field of Search .......................................... 277/208,
 222, 223, 235, 235 (A), 224; 277/231

[56] References Cited
 FOREIGN PATENTS
 67,325 4/1940 Czechoslovakia............ 277/208
 930,089 7/1963 Great Britain................ 277/235(A)
 877,905 9/1942 France ........................ 277/223

Primary Examiner—Samuel B. Rothberg
Attorney—Holcombe, Wetherill & Brisebois

ABSTRACT: This specification discloses a sealing ring particularly a piston ring for an internal combustion engine, comprising a base ring, the outer periphery of which includes a generally plane cylindrical zone, and a coating of a wear resistant material provided on said zone. In the ring disclosed, the outer peripheral surface of the coating is provided with a plurality of axially spaced circumferentially extending lands.

SEALING RINGS

The present invention relates to sealing rings, and more particularly to piston rings for internal combustion engines or compressors, the outer peripheral or cylinder engaging surfaces of which are coated or inlaid with a wear resistant material which prolongs the life of the rings.

Piston rings of this type possess the disadvantage that they require an extended bedding-in period, and it has been proposed to accelerate this bedding-in in a number of ways. One method which has been proposed is to machine the peripheral surface of the base ring so as to form therein a plurality of lands or peaks, or a continuous helical land in the form of a screw thread, and then to plate the periphery with a wear resistant material such as chromium, so that the resultant coating reproduces the contours of the periphery of the base ring. During initial operation of such a ring, the land or lands engage the cylinder wall and are worn down comparatively quickly, thus accelerating bedding-in.

It is an object of the present invention to provide an improved piston ring of the previously mentioned type.

According to the present invention there is provided a sealing ring, particularly a piston ring for an internal combustion engine, comprising a base ring, the outer periphery of which includes a generally plane cylindrical zone, said zone being provided with a coating of a wear resistant material, the outer peripheral surface of which coating is provided with a plurality of axially spaced circumferentially extending lands or peaks.

The invention also consists in a method of manufacturing a sealing ring as previously defined, which comprises applying to a plane cylindrical outer peripheral zone of a base ring, a coating of a wear resistant material, and machining or otherwise forming the outer peripheral surface of the coating to produce thereon a plurality of axially spaced circumferentially extending lands or peaks.

The invention also consists in an internal combustion engine incorporating one or more sealing rings as previously defined.

By the term "wear resistant material" used herein and in the claims is meant a material having a wear resistance which is superior to that of the material of the base ring.

In order that the invention may be more readily understood, reference will now be made to the accompanying drawing, in which:

FIGS. 1 to 3 are transverse sections of sealing rings constructed in accordance with various embodiments of this invention.

Referring to FIG. 1, there is shown a sealing ring, and in particular a piston ring for an internal combustion engine, which comprises a base ring 1 formed, for example, from cast iron or steel, having a cylindrical outer peripheral surface 2. This surface 2 may, as shown, be beveled at 3. Applied to the surface 2, for example, by electroplating, is a deposit of a wear resistant material 4, such as chromium, which is machined or otherwise formed to provide a plurality of circumferentially extending axially spaced, lands or peaks 5 which, during operation of the ring, constitute the cylinder engaging surfaces thereof.

In the embodiment shown in FIG. 2, the wear resistant material 4 is deposited in a circumferentially extending channel 6 in the outer peripheral surface of the base ring 1. The outer peripheral surface of the wear resistant material 4, as well as the axial extremities of the base ring 1 are then machined or otherwise formed to produce the peaks 5 and 7 respectively.

During initial operation of the piston rings illustrated in FIGS. 1 and 2, the peaks 5 and 7, since they present a comparatively small contact area to the wall of the cylinder within which they are located, wear down comparatively rapidly, thus accelerating bedding-in. Furthermore, the grooves between the peaks serve to retain oil, which is important when the rings are employed as top compression rings which generally tend to be starved of oil.

In some cases, however, these grooves tend to collect oil and pass this oil up into the combustion chamber above the crown of the piston to which the rings are assembled. In such applications, in order to avoid this disadvantage, the corrugated periphery of the deposit may be provided with an overlay of a soft bearing material such as copper, tin, polytetrafluoroethylene, silver or the like. Such a construction is illustrated in FIG. 3, where the overlay is indicated at 8. This overlay 8 lies in and fills the grooves between adjacent peaks 5, but due to its comparatively soft nature does not retard bedding-in, since the peaks of the wear resistant material, will rapidly come into contact with the cylinder bore during initial operation, and will rapidly bed-in.

The thickness of the deposits illustrated in the FIGS.; as well as the height and pitch of the peaks or lands, will depend upon the particular dimensions and applications of the rings, as well as the particular materials employed for the base ring and deposited coating. For example, a diesel engine piston ring of up to 6" diameter may have a deposit thickness of between 4 and 6 thou., whilst a petrol engine piston ring of up to 4" diameter may have a deposit thickness of between 2 and 3 thou. The peak height may be approximately one-tenth thou., and, for rings of the order of ⅛" in axial thickness, there may be of the order of 10 axially spaced lands or peaks.

It will be understood that various modifications may be made without departing from the scope of the present invention. For example, although the wear resistant material may be electroplated chromium, it is to be understood that other wear resistant materials may be employed, which may be applied by different techniques. For example, molybdenum, aluminum oxide, tungsten carbide or the like may be employed, and the chosen material may be applied by spraying instead of plating, for example, by means of a flame gun or plasma spray gun. Moreover, the soft overlay 8 illustrated in FIG. 3, may also be applied to the ring shown in FIG. 1 or 2.

The lands or peaks may be separate, axially spaced peaks, or may be formed, in the manner of a screw thread around the periphery of the wear resistant coating, as a single helical peak.

We claim:

1. A piston ring for a high speed internal combustion engine, comprising a base ring, the radially outer periphery of which includes a generally cylindrical zone defined by the locus of a straight line extending substantially parallel to the ring axis and moved around a generally circular path, the center of which is coincident with the ring axis, and a thin deposit of a wear resistant material possessing a hardness greater than that of the material of the base ring built up in situ on said zone to an overall radial thickness between 0.002 and 0.006 inch, the outer peripheral surface of which deposit constitutes the running surface of the sealing ring, and is provided with a plurality of axially closely spaced circumferentially extending lands which define therebetween a plurality of grooves, the radial depth of which is substantially less than said radial thickness of the deposit.

2. A sealing ring as claimed in claim 1, wherein the wear resistant deposit is provided in a circumferentially extending channel in the outer peripheral surface of the base ring.

3. A sealing ring as claimed in claim 1, wherein an overlay of a soft bearing material lies between adjacent lands of said deposit.

4. A sealing ring as claimed in claim 2, wherein the base ring is formed from one of the following materials, namely: cast iron and steel, and wherein said wear resistant material is selected from one of the following materials, namely: chromium, molybdenum, aluminum oxide and tungsten carbide.

5. A sealing ring as claimed in claim 1 in which said deposit is chromium.